Feb. 29, 1944. N. S. FOCHT 2,342,729
HYDRAULIC SHOCK ABSORBER
Filed Oct. 30, 1942 4 Sheets-Sheet 2
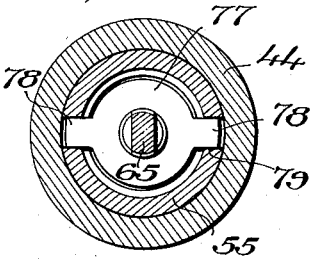
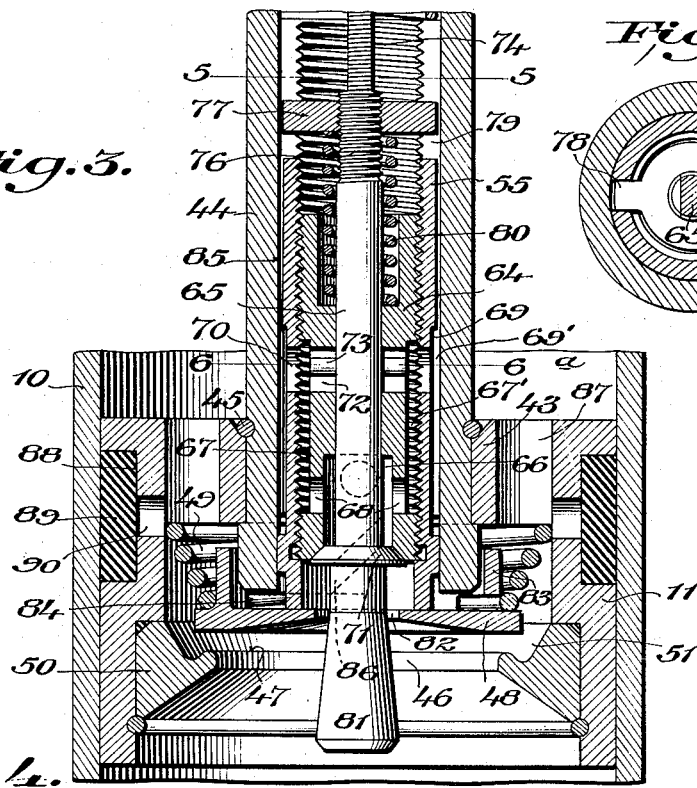
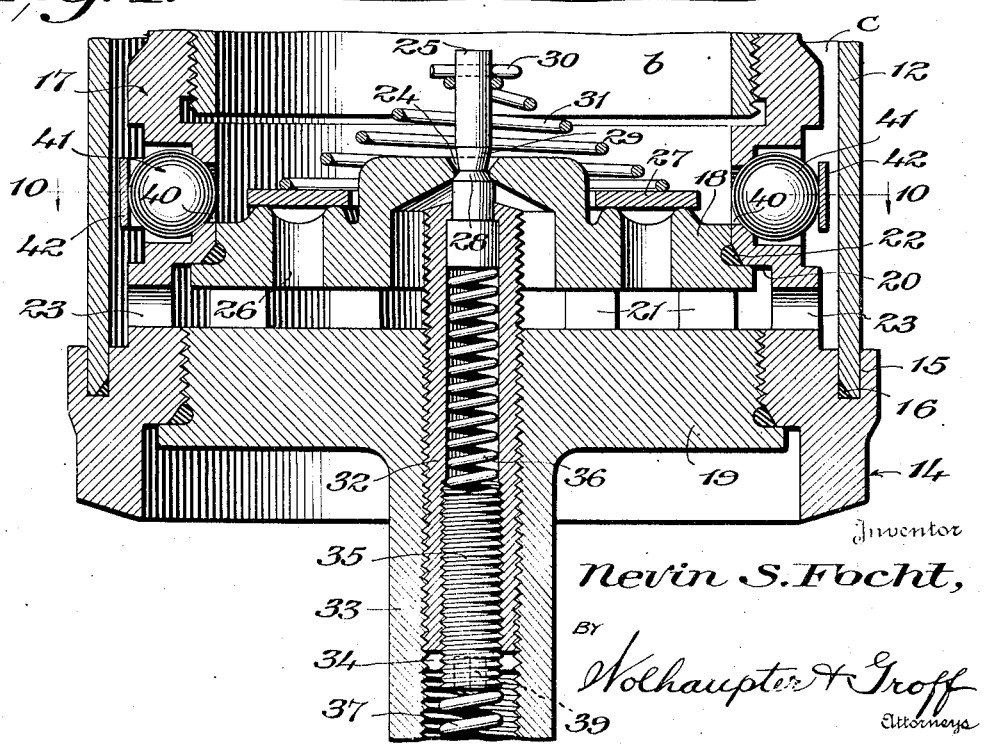
Inventor
Nevin S. Focht,
By
Nolhaupter & Groff
Attorneys Feb. 29, 1944. N. S. FOCHT 2,342,729
HYDRAULIC SHOCK ABSORBER
Filed Oct. 30, 1942 4 Sheets-Sheet 3
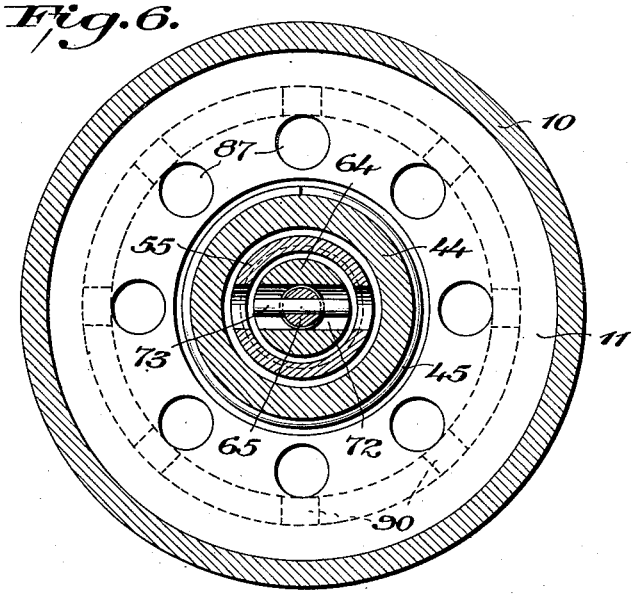
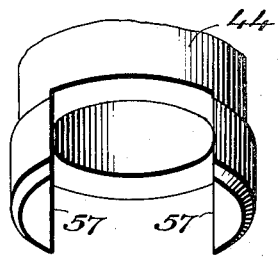
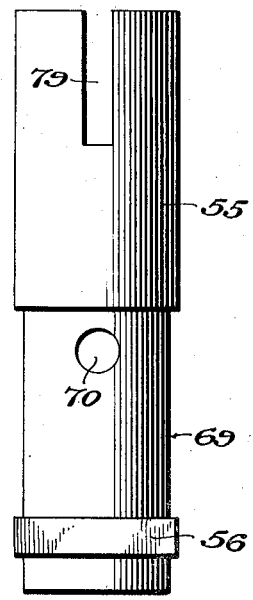
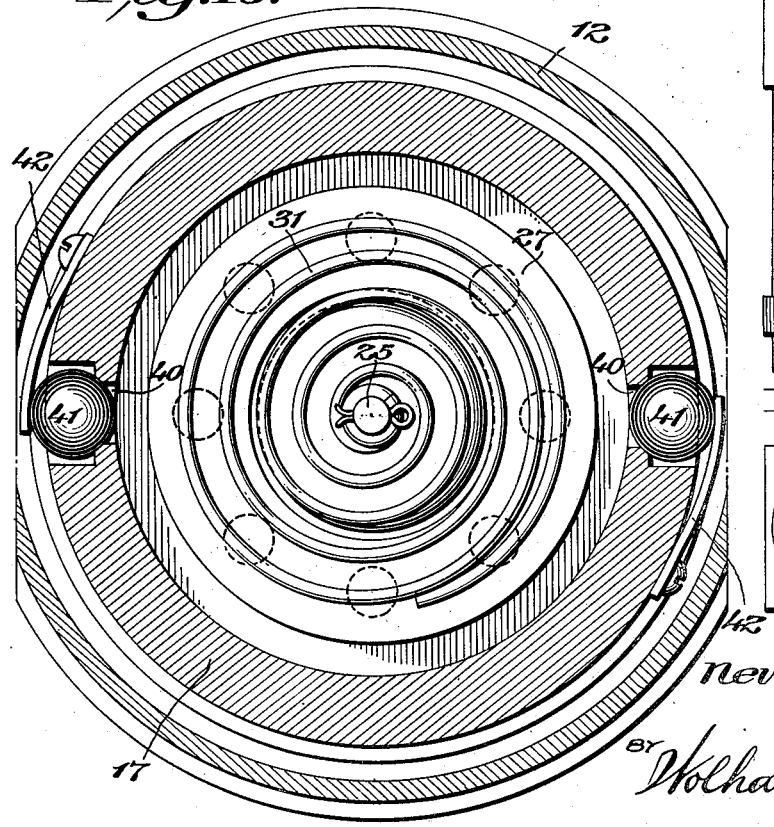
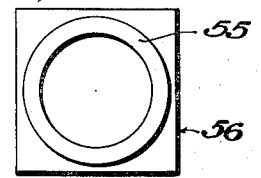
Inventor
Nevin S. Focht,
by Wolhaupter & Groff
Attorneys

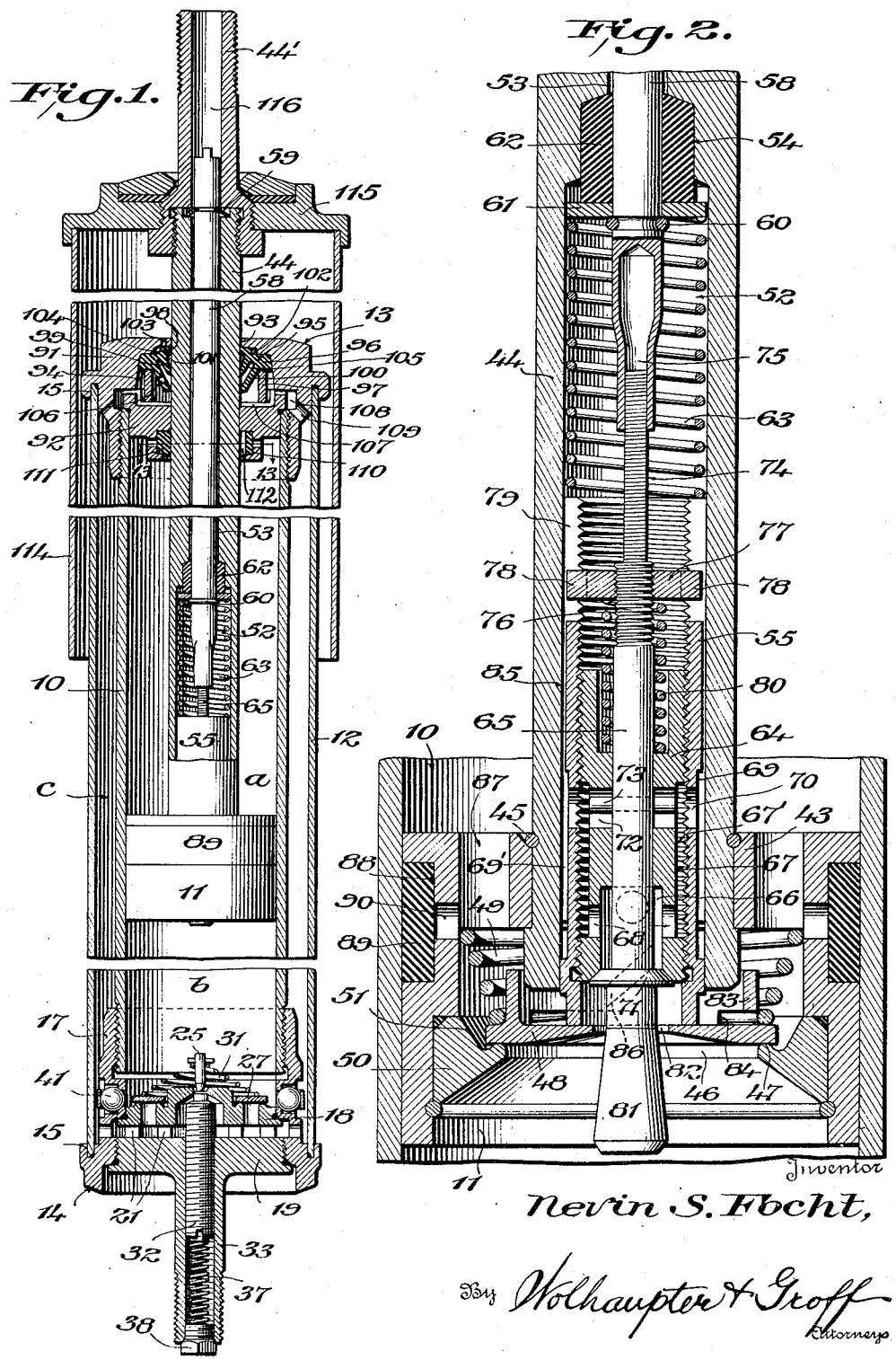

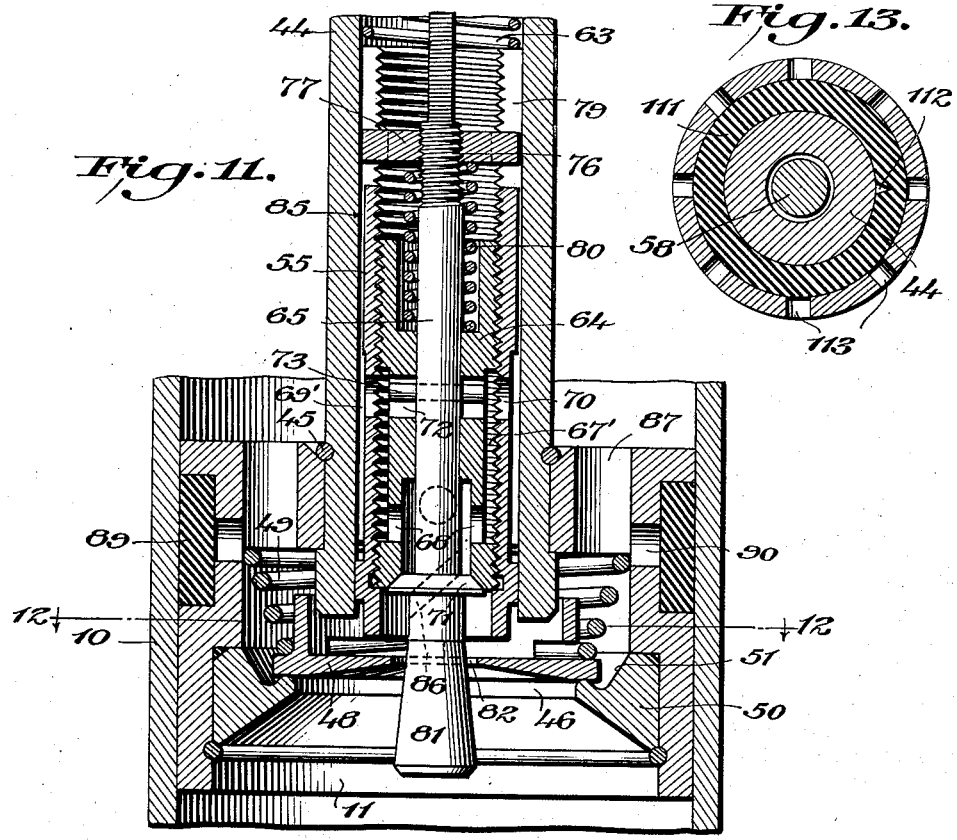

Patented Feb. 29, 1944

2,342,729

UNITED STATES PATENT OFFICE 2,342,729

HYDRAULIC SHOCK ABSORBER

Nevin S. Focht, Syracuse, N. Y.

Application October 30, 1942, Serial No. 463,925

15 Claims. (Cl. 188—88)

This invention relates to shock absorbers, and has particular reference to improvements in hydraulic shock absorbers of the cylinder and piston or strut type as described and claimed, for example, in prior Patents Nos. 2,035,954, 2,036,623, 2,144,583 and 2,240,644.

One special object of the invention is to provide, in a shock absorber of the type mentioned, improved valve means for controlling flow of liquid from the cylinder to the reservoir thereof when the shock absorber is subjected to compression force.

Another special object of the invention is to provide, in a shock absorber of the type mentioned, improved valve means for controlling flow of liquid through the piston between the cylinder chambers at opposite ends of the piston under the influence of compression and rebound or expansion forces imposed on the shock absorber.

Another special object of the invention is to provide, in a shock absorber of the type mentioned, improved sealing means to prevent the escape of liquid from the shock absorber through the opening in the head thereof through which the piston rod extends and to admit air to the shock absorber as required to insure proper operation thereof.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the accompanying drawings, wherein like characters of reference denote corresponding parts in the different views—

Figure 1 is a central, longitudinal section through a shock absorber embodying the features of the invention.

Figure 2 is a central, longitudinal section on an enlarged scale through the piston and piston rod of the shock absorber showing the normal positions of the valve elements thereof.

Figure 3 is a view similar to Fig. 2 showing the positions assumed by the piston-carried valve elements under the influence of compression above normal force imposed upon the shock absorber.

Figure 4 is a central vertical section on an enlarged scale through the valve means for controlling flow of liquid from the cylinder to the reservoir of the shock absorber when the latter is subjected to compression force.

Figure 5 is a cross section on the line 5—5 of Fig. 3.

Figure 6 is a cross section on the line 6—6 of Fig. 3.

Figure 7 is a perspective view of the lower end portion of the piston rod.

Figure 8 is a side elevation of the plunger of the piston and piston rod valve mechanism.

Figure 9 is an end view of the plunger of Fig. 8.

Figure 10 is a cross section on the line 10—10 of Fig. 4.

Figure 11 is a view similar to Figs. 2 and 3 showing the positions assumed by the piston-carried valve elements at the end of the compression above normal phase of operation of the shock absorber.

Figure 12 is a cross section on the line 12—12 of Fig. 11; and

Figure 13 is a cross section on the line 13—13 of Fig. 1.

Referring to the drawings in detail, it will be observed that the present shock absorber is of the cylinder and piston or strut type described and claimed in my aforementioned patents and includes a cylinder 10 and a piston 11 for connection, respectively, with any desired pair of relatively movable elements such, for example, as the axle and the chassis of a motor vehicle.

While the present shock absorber may be disposed for operation either vertically or horizontally or at any desired inclination, it will be assumed, for the purpose of simplifying the present description, that it is disposed vertically.

Concentric with and surrounding the cylinder 10 in spaced relationship thereto is a tube 12, while closing the upper and the lower ends of said cylinder and tube and holding them in their spaced apart relationship are upper and lower heads designated generally as 13 and 14, respectively. These heads are threaded onto the end portions of the cylinder 10 and are provided with annular grooves or channels 15 accommodating the end portions of the tube 12. Thus, by screwing said heads onto the cylinder 10 the tube 12 is clamped between said heads and a rigid assembly of the cylinder, tube and heads results, suitable packing 16 preferably being provided between the heads and the ends of the tube to insure against any leakage of liquid from the shock absorber at these locations.

The piston 11 divides the cylinder 10 into upper and lower pressure chambers $a$ and $b$, respectively, while the space between the cylinder 10 and the tube 11 constitutes a liquid reservoir designated as $c$.

Referring particularly to the lower head 14, it is pointed out that the same may be of one-piece construction, but that, for ease and convenience of manufacture it preferably is of plural-part construction comprising a shell 17, a valve seat element 18 and a plug 19. The shell 17 is the part of said head which is threaded onto the lower end of the cylinder 10 and which has therein the upwardly opening groove or channel 15 which accommodates the lower end portion of the tube 12. Internally the lower end portion of the shell 17 is of greater diameter than the portion thereof thereabove, thereby providing an annular downwardly facing shoulder 20. The valve seat element 18 is of disk-like form and its upper portion fits neatly into the portion of the shell 17 above the shoulder 20 thereof while its lower portion is of greater diameter and seats upwardly against said shoulder. The plug 19 is threaded into the lower end portion of the shell 17 and at its top is provided with spaced apart projections 21 which engage the bottom face of the valve seat element 18 and thereby serve to hold said valve seat element operatively positioned in said shell in closing relationship to the lower end of the cylinder 10. Between the valve seat element 18 and the shell 17 is a suitable packing 22 to insure against any escape of liquid from or to the pressure chamber $b$ of the cylinder 10 except under valve control in accordance with the invention.

The projections 21 may be in the form of segments formed by cutting radial channels across a pair of concentric annular ribs provided in any suitable manner on the top of the plug 19, or they may be of any other suitable form. In any event, the spaces between said projections and between the lower face of the valve seat element 18 and the upper face of the plug 19 constitutes ducts affording communication between the pressure chamber $b$ and the liquid reservoir $c$ through ports 23 in the shell 17; through a small central port 24 in the valve seat element 18 under the control of a metering pin 25, and through an annular series of ports 26 in said valve seat element under the control of a valve 27.

The metering pin 25 extends through the port 24 and within the effective portion of its length is downwardly and inwardly tapered and then is downwardly and outwardly flared, as indicated at 28 and 29, respectively, for liquid metering cooperation with the port 24.

The valve 27 is in the form of a flat ring to seat downwardly upon the top of the valve seat element 18 to close the ports 26, and between this valve and a cross pin 30 or other suitable abutment carried by the metering pin 25 at the upper end thereof is an expansion coil spring 31 which tends constantly to urge said metering pin upwardly and said valve downwardly.

The metering pin 25 is supported and guided for vertical movement by having its lower end portion slidably fitted in the upper end portion of a tube 32 which is threaded in the plug 19, and in a stem 33 extending downwardly therefrom, for vertical adjustment with respect thereto, and in accordance with the invention said tube is designated to serve in any suitable manner to limit upward movement of said metering pin. For example, the lower end portion of said metering pin may be of greater diameter than the portion thereabove, thereby to provide an upwardly facing shoulder, and the tube 32 at its top may be provided with a downwardly facing shoulder engageable by the said metering pin shoulder. In any event, because of said metering pin being urged constantly upwardly, and because of its upward movement being limited by the tube 32, vertical adjustment of said tube serves to predetermine the normal positions of the effective metering portions 28, 29 of said metering pin relative to the port 24.

The stem 33 is designed for use in attaching the cylinder element of the shock absorber to one of the relatively movable elements, such as a vehicle axle, to be controlled by the shock absorber, and the lower end of the tube 32 is notched or otherwise suitably formed, as indicated at 34, for engagement by a suitable implement inserted through the lower end of the stem 33 to effect rotation and consequent vertical adjustment of said tube.

In the tube 32 is threaded a plug 35, and between this plug and the lower end of the metering pin 25 is interposed an expansion coil spring 36 which augments the spring 31 in urging said metering pin upwardly. By adjusting the plug 35 in the tube 32 the strength of the spring 36 may be varied, and by means of a second coil spring 37 interposed between the lower end of the plug 35 and a cap piece 38 which is employed to close the lower end of the stem 33, the said plug 35 may be retained in any adjusted position thereof. The plug 35 is suitably formed at its lower end, as with a socket 39, for engagement by a suitable implement insertable through the lower end of the stem 33 to effect rotation and consequent vertical adjustment of said plug.

Directly above the valve seat element 18 the sleeve 17 is provided with ports 40 affording communication between the pressure chamber $b$ and the reservoir $c$ under the control of ball or other suitable check valves 41 which open outwardly and close inwardly relative to the chamber $b$ and normally are maintained closed by leaf or other suitable springs 42 of desired strength so that they open only when a certain pressure is developed in the chamber $b$.

At the top of the piston 11 is a wall 43 having therein a central bore in which is snugly disposed the lower end portion of a piston rod 44 which may be secured to said piston in any desired manner and which extends upwardly therefrom through the pressure chamber $a$ and through the upper cylinder head 13 for connection in any desired manner with the second of the pair of relatively movable elements, such as the chassis of a motor vehicle, to be controlled by the shock absorber.

In the present instance the lower end portion of the piston rod 44 extends below the wall 43 and is of enlarged diameter as compared with the portion of said rod thereabove, thus providing an upwardly facing shoulder. This shoulder engages the under face of the wall 43. On the other hand, a split ring 45 is seated in a groove in the piston rod and engages the top of the wall 43. Thus, the piston and the piston rod are interlocked with each other for unitary reciprocation.

Below the wall 43 the piston 11 is hollow and suitably constricted to provide a large central port 46 surrounded by a valve seat 47 with which cooperates a valve 48 of the disk type to control flow of liquid through said port.

The valve seat 47 faces upwardly and the valve 48 is disposed in the piston space above said seat to open upwardly and to close downwardly, being constantly urged downwardly by a coil spring 49 interposed between the same and the piston wall 43.

Preferably a ring 50 separate from the piston 11 is suitably secured in the lower portion of said piston to provide the port 46 and the valve seat 47, but, if desired, the equivalent of said ring may be provided as an integral part of the piston. In any event, from the valve seat 47 upwardly a suitable distance the hollow portion of the piston or the ring 50, as the case may be, is flared, as indicated at 51, so that as the valve disk 48 rises from its seat 47 liquid may flow upwardly through the port 46 and across the edge of said valve disk at a progressively increasing rate.

The piston rod 44 is bored from its lower end upwardly a suitable distance to provide therein a valve chamber 52, while above said chamber said rod is provided with a smaller axial bore 53 which, at its lower end, is counterbored as indicated at 54.

Vertically slidable in the lower portion of the chamber 52 is a plunger sleeve 55 which is held against rotation in any suitable manner as, for example, by having, near its lower end, exterior flat faces 56 engaging companion internal flat faces 57 on the piston rod near the lower end of the latter, the said flat faces 57 being provided, for example, by milling a slot across the lower end portion of said piston rod (see Fig. 7).

In the bore 53 of the piston rod 44 is a rod 58 which, with respect to said piston rod, is freely rotatable but is held against vertical movement in any suitable manner as, for example, by means of a washer-like member 59 engaged in an annular groove therein and with the upper end of the piston rod 44, thereby holding said rod 58 against downward movement, and by means of a cooperating ring 60 also engaged in an annular groove therein and engaging the underside of a disk or washer 61 disposed against the lower end of a packing member 62 in the counterbore 54, thereby holding said rod 58 against upward movement.

Between the upper end of the plunger sleeve 55 and the disk or washer 61 is interposed an expansion coil spring 63 which tends constantly to urge said disk or washer upwardly and said plunger sleeve downwardly. The packing member 62 is composed of rubber or other suitable material, fills the counterbore 54 in surrounding relationship to the rod 58 and, under the pressure exerted upwardly thereagainst by the spring 63, maintains a tight seal with the rod 58, thereby preventing any escape of liquid from the top of the valve chamber 52 through the bore 53. On the other hand, downward movement of the plunger sleeve 55 is limited by engagement of the lower end thereof with the disk valve 48 and by engagement of said disk valve with its seat 47.

The plunger sleeve 55 is internally threaded and has threaded therein a metering pin guide member 64 having an axial bore through which extends a vertically disposed metering pin 65.

From its lower end upwardly a suitable distance the guide member 64 is provided with a bore 66 of larger diameter than the metering pin 65, while exteriorly throughout a suitable portion of its length between its upper and its lower ends said guide member 64 is of reduced diameter, as indicated at 67, to provide, between said guide member and the sleeve 55, an annular liquid accommodating space 67' which is in communication with the bore 66 through transverse holes 68 in the wall of said guide member between said bore and said annular space.

The plunger sleeve 55 also is of reduced diameter throughout a suitable portion of its length between its upper and its lower ends, as indicated at 69, to provide between the same and the piston rod 44 an annular liquid accommodating space 69' which is in communication with the space 67 through transverse holes 70 in said sleeve within the length of the reduced-diameter portion thereof.

On the metering pin 65 is a valve 71 for downwardly opening and upwardly closing cooperation with a valve seat at the lower end of the guide member 64 to control flow of liquid from the bore 66 through the lower end of said guide member, while extending transversely through said metering pin 65 into vertically elongated transverse holes 72 in said guide member 64 is a pin 73. Thus, the guide member 64 is connected to the metering pin 65 for rotation by the latter and, at the same time, said metering pin is permitted to move vertically in said guide member to permit opening and closing of the valve 71.

Between the upper end portion of the metering pin 65 and the lower end portion of the rod 58 is a suitable connection, whereby said metering pin and the guide member 64 pinned thereto are rotatable in response to rotation of said rod 58 and whereby free vertical movement of said metering pin relative to said rod 58 is permitted at all times. In the present instance this connection is provided by cutting away opposite sides of the upper end portion of the metering pin or by otherwise suitably flattening its upper end portion, as indicated at 74, and by suitably providing the lower end of the rod 58 with a flattened socket 75 in which the said flattened upper end portion of said metering pin is disposed. In any event, by rotating the rod 58 the metering pin 65 and the guide member 64 are rotated and thereby said guide member is vertically adjusted relative to the non-rotatable plunger sleeve 55.

The upper end portion of the metering pin 65 is threaded, as indicated at 76, and has engaged with the threads thereof a nut 77 which is suitably engaged nonrotatively and vertically slidably with the plunger sleeve 55, as, for example, by having projections 78 thereon engaged in vertical slots 79 in said plunger sleeve. Thus, rotation of the metering pin results in vertical adjustment of the nut 77 relative thereto. Moreover, the pitch of the metering pin threads differs from the pitch of the threads between the plunger sleeve 55 and the metering pin guide member 64. Thus, rotation of the metering pin additionally results in vertical adjustment of the nut 77 relative to said guide member 64.

Between the nut 77 and the guide member 64 is an expansion coil spring 80 which constantly reacts from said guide member upwardly upon said nut and thereby tends constantly to raise the metering pin 65 and thus maintain the valve 71 closed. Obviously, by vertical adjustment of the nut 77 relative to the guide member 64 the strength of the spring 80 is varied.

The rod 58 is formed at its upper end in any suitable manner for engagement by any suitable implement for effecting its rotation and thereby effecting rotatable adjustments of the metering pin 65.

The lower end portion of the metering pin 65 is downwardly flared, as indicated at 81, and extends through a central port 82 in the disk valve 48. Thus, vertical movement of the disk valve 48 and the metering pin 65 relative to each other results in the flared lower end portion of the metering pin varying the effective area of the port 62 and regulating flow of liquid through said port.

Rising from the disk valve 48 is an annular flange 83 with which is engaged the lower end of the coil spring 49, whereby said valve is held centrally disposed with respect to its seat 47 and with respect to the port 46. However, any other suitable means may be provided for this purpose. Moreover, the flange 83, if provided, preferably but not necessarily has one or more openings 84 therein for free flow of liquid therethrough.

The transverse slotting or milling of the lower end portion of the piston rod 44 preferably extends upwardly as far as the lower face of the piston top wall 43, and the lower end of the reduced-diameter portion 69 of the plunger sleeve 55 is located so as to communicate, in all raised and lowered operative positions of said plunger sleeve, with the hollow interior of the piston 11 through the slotted or milled lower end of the piston rod.

Above its reduced-diameter portion 69 the plunger sleeve has a definite and predetermined clearance from the piston rod 44, as indicated at 85, to permit liquid to flow slowly, at a predetermined rate under a given pressure, between the valve chamber 52 above the sleeve 55 and the clearance space 69' which, as aforesaid, is in constant communication with the hollow interior of the piston 11 above the disk valve 48.

Extending diagonally through the metering pin 65, from a point above the valve 71 to a point below said valve, is a bleed duct 86 whereby a small amount of liquid may flow between the bore 66 and the lower end of the plunger sleeve 55 when the valve 71 is closed.

Extending through the top wall 43 of the piston 11 is an annular series of openings 87 through which the chamber a is in constant communication with the interior of said piston above the valve 48, while providing constant communication between the interior of the piston 11 and an annular exterior channel 88 therein in which is disposed a packing ring 89 of rubber or other suitable material, are openings 90 whereby said packing ring is urged outwardly against the wall of the cylinder 10 by liquid under pressure in the piston and any flow of liquid between the chambers a and b thereby is prevented except under control of the valves of the shock absorber.

As in the case of the lower cylinder head 14, the upper cylinder head 13 preferably is of plural-part construction for ease and convenience of manufacture and to facilitate the embodiment therein of means to seal the top of the cylinder 10 against the escape of liquid therefrom through the opening in said head through which the piston rod 44 extends and to admit air to the reservoir c as required to control aeration of the liquid with which the shock absorber is charged. Thus it will be observed that the cylinder head 13, apart from the sealing elements embodied therein, is composed of two parts; viz., a shell 91 similar to the shell 17 of the lower head 14 and a plug 92 which is secured in closing relationship to the upper end of the cylinder 10 by said shell 91.

The shell 91 is the part of the head 13 which is screwed onto the upper end of the cylinder 10 and which has therein the groove 15 which accommodates the upper end of the tube 12, and in accordance with the invention said shell additionally is provided with a central opening 93 through which the piston rod 44 extends and with a central, downwardly opening recess 94 surrounding the piston rod and in which is disposed a gasket 95 for sealing cooperation with said piston rod.

The gasket 95 may be formed from rubber or other suitable pliable material either in one piece or, for convenience and facility in manufacture, in two or more cooperating pieces. In any event, said gasket comprises an annular body portion 96 which snugly fits into the upper portion of the recess 94 and which is held tightly therein by being engaged at its under side by the upper edge of a ring 97 which, at its lower edge, rests on the top of the plug 92.

At the top of the gasket body portion 96 is an annular, inwardly extending lip 98 which, at its inner edge, is in sealing engagement with the piston rod 44, while extending downwardly and inwardly from said body portion 96 below the lip 98 are two additional annular lips 99 and 100, respectively, which, at their inner or lower free edges, are in wiping engagement with the piston rod 44.

Between the lips 98, 99 and the piston rod 44 is an annular space 101, while in the shell 91 above the gasket 95 is another annular space 102 which is in communication with the atmosphere through one or more small holes 103 in said shell 91 and also in communication with said space 101 through one or more small holes 104 in the gasket 95.

Between the lips 99, 100 and the piston rod 44 is an annular space 105 which is in communication with the interior of the ring 97 through one or more small holes 106 in the lip 100, while extending across the top of the plug 92 is one or more grooves or channels 107 through which the space interiorly of the ring 97 is in communication with an annular channel 108 in the shell 91. Moreover, one or more holes 109 in the shell 91 provide communication between the annular channel 108 and the liquid reservoir c. Thus, the space 105 is in communication with the reservoir c through the holes 106 in the lip 100, the interior of the ring 97, the channels 107, the annular space 108 and the holes 109.

In the lower portion of the plug 92 is an inwardly opening annular channel 110 in which is disposed a ring 111 of rubber or other suitable pliable material which surrounds the piston rod 44 in sealing engagement therewith and which is provided at its inner side with a small V-shaped groove 112 extending from end to end thereof. A series of openings 113 in the lower portion of the plug 92 provide communication between the chamber a and the outer side of the channel 110 whereby liquid under pressure in said chamber a may act inwardly upon the ring 111 to urge the same into sealing engagement with the piston rod 44 and to cause the groove 112 to close.

During filling of the shock absorber with liquid the groove 112 serves as a vent to permit escape of air from the chamber a to and through the openings in the head 14 through which the piston rod 44 extends whereby said chamber a may be completely filled with liquid. Moreover, under lower working pressures in the chamber a the groove 112 allows a small amount of liquid to escape from the chamber a into the chamber 94 together with any air which may have found its way into said chamber a. Thus, little or no aeration of liquid in the chamber 94 occurs as a result of escape of air from the chamber *a* into said chamber 94, and if any small amount of aeration should take place the aerated liquid settles out in the reservoir *c* before it reaches the lower part of said reservoir and the chamber *b*. As the pressure in chamber *a* rises the vent groove 112 closes and the ring 111 then effectively prevents any escape of liquid from said chamber *a* to the chamber 94, all as more fully set forth in my prior Patent No. 2,240,644 of May 6, 1941.

Upon rebound strokes of the piston 11, that is to say, when said piston moves upwardly in the cylinder 10, the valve 27 opens and replenishing liquid for the chamber *b* flows into said chamber through the ports 23 and 26 from the reservoir *c*. The level of the liquid in the reservoir *c* thereby drops and results in tendency to produce in said reservoir a partial vacuum which, if permitted to occur, would interfere with flow of replenishing liquid to the chamber *b*. However, upon tendency of a partial vacuum to occur in the reservoir *c*, the lip 99 may flex outwardly and permit air to enter said reservoir via the hole or holes 103, the space 101, the holes 106, the grooves or channels 107 and the openings 109. At the same time, any liquid which may tend to escape from the chamber *a* along the piston rod 44 is scraped off of said piston rod into the chamber 94 by the lip 100 to return to the reservoir *c* with the vacuum-preventing air entering said reservoir, and should any liquid cling to the portion of the piston rod above the lip 100 it is wiped from said rod by the lips 99, 98 to return to the reservoir *c* with the vacuum-preventing air. Thus, the upper head 13 through which the piston rod 44 extends, is effectively sealed against loss of liquid therethrough from the shock absorber; air is permitted to enter the reservoir *c* to avoid any undesirable partial vacuum therein, and aeration of liquid in the shock absorber substantially is eliminated and, in any event, is controlled so that it does not interfere with proper functioning of the shock absorber.

Though not essential, the piston rod 44 preferably is equipped with a tube 114 which is disposed in surrounding, covering relationship to the head 13 and the upper portion of the cylinder 10 to reduce the possibility of foreign matter gaining access to the shock absorber through the said head 13 thereof. This tube 114 may be attached to the piston rod 44 in any suitable manner and is illustrated in Fig. 1 of the drawings as being carried by a head 115 which in turn is carried by an upward extension 44' of the piston rod 44 screwed onto the upper end of said piston rod, said extension 44' having therein an axial bore 116 affording access to the upper end of the rod 58 of a suitable tool or instrument for rotatively adjusting said rod.

The springs 36 and 42 are of such strengths that the metering pin 25 will be forced downwardly by liquid in the chamber *b* under a considerably lower pressure than is required to open the valves 41. Moreover, the strengths of the springs 36, 42, 49 and 63 are such that the valve 48 will be opened by liquid in the chamber *b* under a lower pressure than is required to move the metering pin 25 downwardly. Furthermore, the springs 36, 42, 49 and 63 are of such strengths in relation to the strength of the suspension spring or springs of the vehicle with which the shock absorber is associated, that certain predetermined pressures of the liquid in the shock absorber are required to effect opening of the different valves of the shock absorber.

Assuming that the piston rod 44, either directly or through its extension 44', is connected with the chassis of a motor vehicle; that the cylinder 10, either directly or through the stem 33 of its lower head 13, is connected to the axle of such vehicle; that the chassis is supported upon the axle through a spring which is under normal load; that the piston 11 is in a normal position approximately midway between the ends of the cylinder 10; that the valves 27, 28, 41, 48 and 71 are in their normally closed positions, and that the shock absorber is charged with a suitable liquid, the same has four distinct phases of operation; viz., (1) compression above normal, as when an obstruction in a roadway is encountered and the vehicle spring is compressed with consequent movement of the cylinder 10 and the piston 11 relative to each other upwardly and downwardly, respectively; (2) rebound above normal, or relative downward and upward movement of the cylinder 10 and the piston 11 from their "compression above normal" status; (3) rebound below normal, as when a depression in a roadway is encountered and the vehicle spring is distended with consequent movement of the cylinder 10 and the piston 11 relative to each other downwardly and upwardly, respectively, from their normal relative position; and (4) compression below normal, or relative upward and downward movement of the cylinder 10 and the piston 11 from their "rebound below normal" status.

As "compression above normal" occurs with consequent movement of the cylinder 10 and the piston 11 relative to each other upwardly and downwardly, respectively, the liquid in the chamber *b* is subjected to increasing pressure dependent upon the magnitude of the relative movement between the cylinder and the piston, with the result that the disk valve 48 is raised (see Fig. 3) and the pressure partly is relieved by flow of some of the liquid from the chamber *b* through the piston 11 via the ports 46 and 87 therein to the chamber *a*. Since, however, due to the presence of the piston rod 44 in the chamber *a*, said chamber *a* cannot accommodate all of the liquid which seeks to escape from the chamber *b* and which must escape therefrom to permit continued relative movement of the cylinder and piston, the rising pressure of the liquid in the chamber *b* acts on the upper end of the metering pin 25 to force said pin downwardly. Downward movement of the metering pin 25 causes the valve portion 28 of said pin to leave its seat and to progressively open the port 24 to permit pregressively increasing flow of liquid from the chamber *b* to the reservoir *c* via the holes 23 until the downwardly and outwardly flared portion 29 of said metering pin begins to cooperate with the least diameter portion of the port 24. During this initial downward movement of the metering pin 25 the pressure in the chamber *b* is further relieved so that for a predetermined amount of relative movement between the cylinder 10 and the piston 11 the total rise of pressure in the chamber *b* will be such as to offer an effective resistance to relative movement between said cylinder and piston and a consequent effective buffing of the vehicle spring compression.

Since the plunger 55 normally rests at its lower end on the disk valve 48, lifting of said disk valve results in lifting of said plunger. The plunger 55 cannot be lifted rapidly, however, due to the chamber 52 thereabove being filled with liquid and due to the throttling of flow of liquid from said chamber by the small clearance 85 between said plunger and the piston rod 44. Therefore, the plunger 55 and, consequently, the disk valve 48 rise more or less slowly, as determined by the rate of flow of liquid from the chamber 52 via the clearance 85, the clearance space 69' and the slotted or milled lower end of the piston rod 44 into the piston and thence into the chamber a. The clearance at 85 in any given shock absorber is definite and predetermined in relation to the vehicle spring with which the shock absorber is used, and is such as effectively to control the frequency of reaction into the vehicle chassis. Moreover, the flared portion 51 of the piston 11 or of the ring 50, as the case may be, is so calibrated as to increase the orifice area between the disk valve 48 and said flared portion dependent upon the amplitude of relative movement between the cylinder 10 and the piston 11; i. e., upon the severity of the roadway "bump" or obstruction encountered, and this in turn determines the amount that the disk valve 48 and, with it, the plunger 55 and the metering pin 65 will be lifted when any given roadway "bump" or obstruction is encountered, thereby predetermining the position of the flared portion 81 of the metering pin 65 relative to the port 82 in the disk valve 48 in subsequently controlling the "rebound above normal" phase of operation of the shock absorber as will later appear.

If relative movement between the cylinder 10 and the piston 11 continues, the pressure in the chamber b will increase and downward movement of the metering pin 25 under the increasing pressure will continue, with the result that the portion 29 of the metering pin will act to progressively decrease the effective cross sectional area of the port 24. Thus, the resistance to relative movement of the cylinder 10 and the piston 11 will progressively increase until the metering pin 25 acts to close or substantially close the port 24, which will occur only during the final portion of relative movement between the cylinder 10 and the piston 11 or, in other words, during the final portion of compression of the vehicle spring. Accordingly, it is this characteristic of increased value of resistance during the final portion of relative movement between the cylinder 10 and the piston 11 which prevents "bottoming" at the end of the vehicle spring compression.

Should the pressure in the chamber b tend to rise above the maximum pressure which the shock absorber is designed to withstand, the valves 41 will open and permit liquid in said chamber b to flow into the reservoir c, thus relieving the chamber b of pressure and safeguarding the shock absorber against damage. In this connection it will be understood, of course, that for a vehicle body and chassis of given weight and a vehicle spring of given strength and amplitude of movement, a shock absorber of the present type for use therewith will be designed to offer an effective resistance to compression of the vehicle spring and will cease to do so only under a pressure equal to or greater than would produce so-called "bottoming" of the vehicle spring.

As the "rebound above normal" phase of operation occurs following the just described "compression above normal" phase of operation, the cylinder 10 and the piston 11 move relatively apart or downwardly and upwardly, respectively, and thereby subject the liquid in the chamber a to pressure. Liquid cannot escape from the top of the chamber a and therefore its only avenue of escape from said chamber a is through the piston 11 to the chamber b.

Upon initiation of the "rebound above normal" phase of operation, the disk valve 48, which was raised during the "compression above normal" phase of operation and which carried the plunger 55 upwardly with it (see Fig. 3), immediately is returned to its seat 47 by its spring 49 (see Fig. 11). The plunger 55, however, does not immediately return, but only gradually returns, to its lowermost position in which its lower end rests on the valve 48, because the clearance 85 between said plunger and the piston rod 44 permits only a small amount of liquid to flow within a given period of time into the chamber 52 above said plunger and because flow of liquid into said chamber 52 above said plunger is necessary to compensate for the space in said chamber vacated by said plunger in order to permit said plunger to be moved downwardly by its spring 63. Accordingly, liquid in the chamber a flows downwardly through the openings 87, beneath the lower end of the plunger 55 and through the port 82 in the disk valve 48 into the chamber b (Fig. 11). However, due to the presence of the piston rod 44 in the chamber a, not enough liquid is delivered from said chamber a to fill the chamber b. Therefore, the valve 27 is drawn open and enough additional liquid is drawn from the reservoir c through the openings 23 and the ports 26 into the chamber b to fill said chamber. At the same time, the springs 31, 36 return the metering pin 25 to its normal, upper position in which its valve portion 28 closes the port 24.

As stated in the description of the "compression above normal" phase of operation of the shock absorber, the amount that the disk valve 48, the plunger 55 and the metering pin 65 are lifted is dependent upon the amplitude of movement between the cylinder 10 and the piston 11; i. e., upon the severity of the roadway "bump" or obstruction encountered. Accordingly, when the disk valve 48 returns to its seat at the end of any given "compression above normal" phase of operation of the shock absorber and as the immediately following "rebound above normal" phase of operation begins, the flared portion 81 of the metering pin 65 will be in a certain raised position relative to the disk valve 48 regulating the effective area of the port 82 and the flow of liquid therethrough and thereby correctly controlling the stored energy in the vehicle spring upon initiation of the "rebound above normal" phase of operation.

As the metering pin 65 gradually moves downwardly the effective area of the port 82 gradually increases and thus, as the rebound energy of the vehicle spring decreases the rebound control proportionately decreases, according to the predetermined amount of flare of the portion 81 of the metering pin 65.

By rotating the rod 58 the metering pin 65 and its guide member 64 may be rotated relative to the non-rotatable plunger 55 and thus said metering pin may be vertically adjusted relative to said plunger to dispose any desired part of its flared lower end portion 81 for cooperation with the port 82 in the disk valve 48, thus to obtain best "rebound above normal" control of any given vehicle spring with which the shock absorber may be associated.

Upon occurrence of the "rebound below normal" phase of operation of the shock absorber, the disk valve 48 remains on its seat 47 and the lower end of the plunger 55 remains on top of said disk valve. As the cylinder 10 and the piston 11 move relative to each other downwardly and upwardly, respectively, liquid in the chamber a is subjected to pressure and flows via the lower end of the piston rod 44 into the annular space 69', the holes 70, the annular space 67' and the holes 68 into the chamber 66 where it acts on the valve 71 to downwardly open the same against the force of the spring 80. It then flows downwardly through the lower end portion of the plunger 55 and the port 82 in the disk valve 48 around the lower end portion 81 of the metering pin 65 into the chamber b. Since the rebound energy of the vehicle spring is decreasing below that required to maintain equilibrium of the chassis, the decreasing control by the valve 71 under the influence of its spring 80 is in keeping with the principle of not disturbing this equilibrium.

According to the invention the power of the spring 80 is automatically increased with upward adjustment of the metering pin 65 and is automatically decreased with downward adjustment of said metering pin, because a vehicle spring whose rate requires either a heavier or a lighter rebound control also will require either a heavier or lighter pop-off value of the valve 71 to control its release as when the vehicle wheel drops into a depression or hole in the roadway. In this connection it is pointed out that the threads 76 of the metering pin 65 have a lesser pitch than the threads between thee plunger 55 and the guide member 64 and that, since the nut 77 is held against rotation by said plunger 55, rotation of the metering pin 65 to adjust the same upwardly results in a lesser amount of upward adjustment of the nut 77 than of the guide member 64, with the result that the spring 80 is compressed and its strength increased. Conversely, rotation of the metering pin 65 to adjust the same downwardly will result in a lesser amount of downward adjustment of the nut 77 than of the guide member 64 and therefore the spring 80 will be permitted to expand with consequent decrease in its strength. The difference in pitch of the threads and the strength of the spring 80 are, of course, predetermined to best adapt any given shock absorber for use with any given vehicle spring.

The "compression below normal" phase of operation of the shock absorber occurs immediately following the "rebound below normal" phase of operation thereof and is caused by the vehicle wheels rising out of a depression or hole in a roadway and the resulting effort toward reestablishment of a condition of equilibrium between the energy of the vehicle chassis exerted downwardly against the force of the vehicle spring exerted upwardly. The loss of vehicle spring energy during this phase of operation is below that needed to maintain equilibrium while the vehicle wheel is riding out of the depression or hole in the roadway and is compensated for by the resistance to compression of the shock absorber offered by the valve 25.

Pitching or low-frequency compression and rebound of the vehicle spring usually is such as to require the transfer of only a minor amount of liquid between the chambers a and b. Accordingly, the port 86 in the metering pin 65 provides for this transfer of liquid to control pitching or low frequency compression and rebound of the vehicle spring while the valves 48 and 71 remain closed.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a hydraulic shock absorber, a cylinder, a piston reciprocable therein, a head at the upper end of said cylinder, a piston rod extending from said piston through said head, a liquid reservoir, said head having a chamber therein in communication with said reservoir, a gasket in said chamber having upper and lower annular lips extending downwardly and inwardly therefrom in spaced relationship to the piston rod and to each other and in wiping engagement at their lower free edges with said piston rod, the lower lip having an opening extending therethrough, and means for the admission of atmospheric air to the space between the upper lip and the piston rod.

2. In a hydraulic shock absorber, a cylinder, a piston reciprocable therein, a head at the upper end of said cylinder, a piston rod extending from said piston through said head, a liquid reservoir, said head having a chamber therein in communication with said reservoir, a gasket in said chamber having upper and lower annular lips extending downwardly and inwardly therefrom in spaced relationship to the piston rod and to each other and in wiping engagement at their lower free edges with said piston rod, the lower lip having an opening extending therethrough, a third annular lip extending inwardly from said gasket above said upper lip and in wiping engagement at its inner free edge with the piston rod, and means for the admission of atmospheric air to the space between said upper lip and the piston rod.

3. In a hydraulic shock absorber, a cylinder, a piston reciprocable therein, a head at the upper end of said cylinder, a piston rod extending from said piston through said head, a liquid reservoir, said head having a chamber therein in communication with said reservoir, a gasket in said chamber having upper and lower annular lips extending downwardly and inwardly therefrom in spaced relationship to the piston rod and to each other and in wiping engagement at their lower free edges with said piston rod, the lower lip having an opening extending therethrough, and a third annular lip extending inwardly from said gasket above said upper lip and in wiping engagement at its inner free edge with the piston rod, said head and said gasket having openings therein providing communication between the atmosphere and the space between said upper lip and the piston rod.

4. In a hydraulic shock absorber, a cylinder, a piston reciprocable therein, a liquid reservoir, a head closing the lower end of said cylinder, said head having ducts affording communication between the lower end of said cylinder and said reservoir, check valve means cooperating with said ducts to permit flow of liquid from said reservoir to the lower end of said cylinder and to prevent flow of liquid from the lower end of said cylinder to said reservoir, said head having a port therein providing communication between the lower end of said cylinder and said reservoir, a metering pin upwardly movable to close said port and having a downwardly tapered portion for downward movement into said port to progressively decrease the effective area of said port, the top of said metering pin being exposed within the lower end of said cylinder for subjection to liquid pressure to urge said pin downwardly, and yieldable means tending constantly to urge said pin upwardly to close said port.

5. In a hydraulic shock absorber, a cylinder, a piston reciprocable therein, a liquid reservoir, a head closing the lower end of said cylinder, said head having a port therein providing communication between the lower end of said cylinder and said reservoir, a metering pin having a valve formation for closing said port by upward movement of said pin, yieldable means tending constantly to urge said pin upwardly to cause said valve formation to close said port, the upper end of said pin being exposed within the lower end of said cylinder so that said pin is downwardly movable by liquid under pressure in the lower end of said cylinder, and said pin having a downwardly tapered portion for downward movement into said port to progressively decrease the effective area of said port.

6. In a hydraulic shock absorber, a cylinder, a piston reciprocable therein, a liquid reservoir, a head closing the lower end of said cylinder, said head having a port therein providing communication between the lower end of said cylinder and said reservoir, a metering pin extending through said port, yieldable means tending constantly to urge said pin upwardly, the upper end of said pin being exposed within the lower end of said cylinder so that said pin is downwardly movable by liquid under pressure in the lower end of said cylinder, said pin having a downwardly flared valve formation for closing cooperation with said port by upward movement of said pin and further having a downwardly tapered portion for downward movement into said port to progressively decrease the effective area of said port, said formations being disposed relative to each other so that upon downward movement of said pin from its port-closing position the effective area of said port first is progressively increased and then is progressively decreased.

7. A hydraulic shock absorber as set forth in claim 4 including a spring between the check valve means and the metering pin urging said check valve means closed and said metering pin upwardly.

8. A hydraulic shock absorber as set forth in claim 5 including means for varying the strength of the yieldable means which urges the metering pin upwardly.

9. In a hydraulic shock absorber, a cylinder, a piston reciprocable therein, a liquid reservoir, a head closing the lower end of said cylinder, said head having a port therein providing communication between the lower end of said cylinder and said reservoir, a metering pin cooperating with said port to control flow of liquid under pressure from the lower end of said cylinder to said reservoir, and spring closed check valve means to be opened under a predetermined high pressure in the lower end of said cylinder to permit escape of liquid from the said lower end of said cylinder to said reservoir.

10. In a hydraulic shock absorber, a cylinder, a piston reciprocable therein, heads closing the ends of said cylinder, a piston rod extending upwardly from said piston through the upper head, said piston being hollow and including a port for flow of liquid therethrough between the cylinder spaces above and below said piston, an upwardly opening downwardly closing disk valve cooperating with said port to control flow of liquid through said cylinder, spring means tending constantly to close said disk valve, said disk valve having a port therein, a downwardly flared metering pin in said port, means whereby said metering pin is lifted with said disk valve when the latter is opened and is restrained to move gradually downwardly through the port in said disk valve following closing of said disk valve, and means for vertically adjusting said metering pin to predetermine its normal position relative to the port in said disk valve when the latter is closed.

11. In a hydraulic shock absorber, a cylinder, a piston reciprocable therein, heads closing the ends of said cylinder, a piston rod extending upwardly from said piston through the upper head, said piston being hollow and including a port for flow of liquid therethrough between the cylinder spaces above and below said piston, an upwardly opening downwardly closing disk valve cooperating with said port to control flow of liquid through said cylinder, spring means tending constantly to close said disk valve, said disk valve having a port therein, a plunger having a hollow lower end normally seating downwardly upon said disk valve in surrounding relationship to the port therein, spring means constantly urging said plunger downwardly, a downwardly flared metering pin carried by said plunger and extending through the port in said disk valve, said plunger and metering pin being upwardly movable with said disk valve when the latter is opened, means whereby said plunger and metering pin are restrained to move gradually downwardly following closing of said disk valve, and spring-closed valve means controlling flow of liquid downwardly through the hollow lower end of said plunger and the port in said disk valve when said disk valve is closed and the lower end of said plunger is seated thereon.

12. In a hydraulic shock absorber, a cylinder, a piston reciprocable therein, heads closing the ends of said cylinder, a piston rod extending upwardly from said piston through the upper head, said piston being hollow and including a port for flow of liquid therethrough between the cylinder spaces above and below said piston, an upwardly opening downwardly closing disk valve cooperating with said port to control flow of liquid through said cylinder, spring means tending constantly to close said disk valve, said disk valve having a port therein, the lower end portion of said piston rod having a chamber therein, a plunger non-rotatably slidably mounted in said chamber and having a hollow lower end normally seating downwardly upon said disk valve in surrounding relationship to the port therein, spring means constantly urging said plunger downwardly, a guide member threaded in said plunger for vertical adjustment relative thereto, a metering pin mounted for vertical sliding movement in said guide member and including a downwardly flared portion extending through the port in said disk valve, means including a valve on said metering pin to be closed by upward movement of said metering pin relative to said guide member and to be opened by downward movement of said metering pin relative to said guide member and operable to control flow of liquid between the portions of the cylinder at opposite ends of said piston when said disk valve is closed and the lower end of said plunger is seated on said disk valve, spring means constantly urging said metering pin upwardly relative to said guide member, said plunger and said guide member and said metering pin being movable upwardly with said disk valve when the latter is opened, means whereby said plunger and said guide member and said metering pin are restrained to move gradually downwardly following closing of said disk valve, and means whereby upward and downward adjustments of said guide member to predetermine the normal position of the flared lower end portion of said metering pin relative to the port in said disk valve respectively increase and decrease the strength of the spring which urges said metering pin upwardly.

13. A hydraulic shock absorber as set forth in claim 12 including a rod operatively connected to the guide member and extending through the piston rod for access exteriorly of the shock absorber to rotate and thereby vertically adjust said guide member relative to the plunger.

14. A hydraulic shock absorber as set forth in claim 12 in which a nut is threaded on the metering pin and is non-rotatable and vertically movable relative to the plunger, in which the spring for urging said metering pin upwardly is interposed between said nut and the guide member, and in which the threads between said metering pin and said nut are of a different pitch from the threads between said guide member and said plunger so that the strength of the spring for urging said metering pin upwardly is increased by upward adjustment of said guide member and is decreased by downward adjustment of said guide member.

15. A hydraulic shock absorber as set forth in claim 12 in which the metering pin is rotatable and is connected to the guide member for rotating and thereby adjusting the same vertically relative to the plunger, and in which a rod is connected to the metering pin and extends through the piston rod for access exteriorly of the shock absorber to rotate said metering pin.

NEVIN S. FOCHT.